US008399770B1

(12) United States Patent
Phillips, Jr.

(10) Patent No.: US 8,399,770 B1
(45) Date of Patent: Mar. 19, 2013

(54) ARM ATTACHMENT BUSHING ASSEMBLY AND METHOD OF USING SAME

(75) Inventor: Earl M. Phillips, Jr., Carrollton, GA (US)

(73) Assignee: The Southern Company, Atlanta, GA (US)

( * ) Notice: Subject to any disclaimer, the term of this patent is extended or adjusted under 35 U.S.C. 154(b) by 78 days.

(21) Appl. No.: 13/223,442

(22) Filed: Sep. 1, 2011

(51) Int. Cl.
*H01B 17/26* (2006.01)

(52) U.S. Cl. ............... 174/152 R; 174/153 R; 174/142; 174/650; 439/371; 361/107

(58) Field of Classification Search ............ 174/152 R, 174/142, 31 R, 153 R, 11 BH, 12 BH, 14 BH, 174/650; 361/39; 439/371
See application file for complete search history.

(56) References Cited

U.S. PATENT DOCUMENTS

| | | | | |
|---|---|---|---|---|
| 5,808,536 A | * | 9/1998 | Sandlin et al. | 336/107 |
| 5,952,617 A | * | 9/1999 | Bergstrom | 174/152 R |
| 6,150,613 A | * | 11/2000 | Bergstrom | 174/152 R |

\* cited by examiner

*Primary Examiner* — Dhirubhai R Patel
(74) *Attorney, Agent, or Firm* — Dustin B. Weeks, Esq.; Troutman Sanders LLP

(57) ABSTRACT

A bushing assembly including a first bushing element, a second bushing element, and a locking subsystem. The first bushing element has a first end, a second end, a first outer surface with a first outer diameter, a first inner surface defining a first channel, and a first flange positioned proximate the first. The second bushing element has a first end, a second end, a second inner surface having a second inner diameter greater than the first outer diameter, a second outer surface, and a second flange positioned proximate the second end. The second inner surface defines a second channel that receives a portion of the first bushing element. The locking subsystem is proximate the first end of the first bushing element and secures the first bushing element to the second bushing element.

11 Claims, 11 Drawing Sheets

ARM ATTACHMENT BUSHING ASSEMBLY AND METHOD OF USING SAME

TECHNICAL FIELD OF THE INVENTION

The various embodiments of the present disclosure relate generally to bushings. More particularly, the various embodiments of the present invention are directed to bushing assemblies for reinforcing a hole through an arm of an electric utility support structure.

BACKGROUND OF THE INVENTION

As shown in FIG. 1A, in conventional electric power transmission and distribution systems 100, electric power is transmitted via electric conductors 145, i.e. wires or cables, suspended overhead by support structures 110, e.g. power poles or transmission towers. The support structures 110 comprise an arm 120, which is often placed near the top of the support structure 110 and positioned normal to the support structure 110. As shown in FIGS. 1B-1C, the arm 120 has a first surface 132, an oppositely situated second surface 131, and at least one hole 130 through the arm 120 between the first surface 132 and the second surface 131. The hole 130 is used as an attachment point to suspend a conductor 145 via an insulator 140. For example, the clevis pin 137 of a Y-type clevis bolt assembly 135 can be inserted through the hole 130. The base 136 of the Y-type clevis bolt assembly 135 is attached to an insulator 140, and the insulator 140 is attached to the conductor 145.

Due to their extreme weights, conductors 145 suspended from the hole 130 often exert downward forces on the hole 130 exceeding 2000 pounds. Unfortunately, over time, these forces, along with friction generated by vibrations of the conductor 145, cause the hole 130 to deteriorate. Specifically, the clevis pin 137 will rub against and erode the interior surface of the hole 130. This is especially problematic because the arms 120 are often made of galvanized steel. Thus, once the galvanizing layer has eroded away, the arm 120 will begin to rust. Conventionally, utility providers address these concerns by replacing the entire arm 120 once deterioration has reached a certain point. This is very costly, as replacement may require the utility provider to de-energize the conductors 145 during the repair.

Therefore, there is a desire for systems and methods for reinforcing and/or repairing a hole 130 on the arm 120 of a support structure 110. Various embodiments of the present invention address such a desire.

BRIEF SUMMARY OF THE INVENTION

The present invention relates to bushing assemblies. Additionally, the present invention relates to bushing assemblies for use in electric power transmission systems. The transmission system comprises a support structure and an arm carried by the support structure. The arm has a first surface, a second surface oppositely situated the first surface, and at least one hole through the arm between the first surface and the second surface. The hole is used to suspend a conductor via at least an insulator and a clevis bolt assembly. Exemplary embodiments of the present invention provide bushing assemblies for repairing and/or reinforcing the hole.

In an exemplary embodiment of the present invention, the bushing assembly comprises a first bushing element and a second bushing element. The first bushing element has a first end, a second end, a first outer surface with a first outer diameter, a first inner surface, and a first flange positioned proximate the first end and extending outward from the first outer surface. The first flange engages the first surface of the arm when the bushing assembly engages the arm of the support structure. The second bushing element has a first end, a second end, a second inner surface having a second inner diameter greater than the first outer diameter, a second outer surface, and a second flange positioned proximate the second end and extending outward from the second outer surface. The second flange engages the second surface of the arm when the bushing assembly engages the arm of the support structure. The second bushing element receives at least a portion of the first bushing element. The hole receives at least a portion of the bushing assembly such that the first inner surface of the first bushing element defines a channel from the first surface of the arm to the second surface of the arm. In another exemplary embodiment of the present invention, the channel defined by the first inner surface of the first bushing element receives at least a portion of the clevis bolt assembly.

In yet another exemplary embodiment of the present invention, the arm attachment bushing assembly further comprises a locking subsystem securing the first bushing element to the second bushing element. In one embodiment, the locking subsystem comprises a groove proximate the second end of the first bushing element and a locking element positioned about the groove having an inner diameter less than the first outer diameter and an outer diameter greater than the second inner diameter. The locking element can engage the second flange. In another exemplary embodiment of the present invention, the locking subsystem comprises: a portion of the first outer surface proximate the second end of the first bushing element that comprises helical threads; and a locking device having an outer surface with an outer diameter greater than the second inner diameter and an inner surface comprising cooperative helical threads engaging the helical threads of the first outer surface proximate the second end of the first bushing element.

In addition to the locking subsystem discussed above, the present invention provides many approaches to securing the first bushing element to the second bushing element. For example, in an exemplary embodiment of the present invention, the second end of the first bushing extends beyond the second end of the second bushing element, and at least one appendage extends outward from the first outer surface of the first bushing element to engage the second flange. In another exemplary embodiment of the present invention, at least a portion of the first outer surface comprises male helical threads and at least a portion of the second inner surface comprises female helical threads for cooperative engagement with the male helical threads.

In yet another exemplary embodiment of the present invention, the arm attachment bushing assembly comprises an attachment device for securing the arm attachment bushing assembly to the arm. The attachment device has a first end engaging the first flange and a second end engaging the second flange. The first flange comprises a first aperture and the second flange comprises a second aperture, the first aperture and the second aperture are aligned and receive at least a portion of the attachment device when the arm attachment bushing assembly engages the arm of the support structure. In an exemplary embodiment of the present invention, the attachment device comprises a nut and bolt.

To address issues with rust associated with a deteriorating hole, in various embodiments of the present invention, the bushing assemblies comprise a corrosion-resistant metal. For example, various components of the bushing assembly can be made of corrosion-resistant steel, brass, and the like.

As discussed above, over time, it is possible for the clevis pin to completely erode through the hole of the arm. In such situations, it will be desirable for a bushing assembly that can be used to replace the hole in the arm, thus eliminating the need to replace the entire arm. Various embodiments of the present invention address such a desire.

For example, an embodiment of the present invention provides a bushing assembly comprising a bushing element and an attachment device. The bushing element has a first end proximate the first surface of the arm, a second end proximate the second surface of the arm, an outer surface having an outer diameter, an inner surface having an inner diameter less than the outer diameter and defining a channel from the first end to the second end, and a flange extending outward from the outer surface proximate the first end and engaging the first surface when the arm attachment bushing engages the arm of the support structure. The first flange comprises a first aperture. The attachment device has a first end and second end, wherein a portion of the attachment device between the first end and the second end passes through the first aperture and the arm such that the first end of the attachment device engages the first flange and the second end of the attachment device engaging the second surface when the arm attachment bushing engages the arm of the support structure. In an exemplary embodiment of the present invention, the attachment device is a nut and bolt. Further, to suspend a conductor from the arm, the channel can receive a portion of the clevis bolt assembly.

In yet another exemplary embodiment of the present invention, the bushing assembly further comprises a mounting bracket comprising a second aperture and a third aperture. The second aperture is aligned with the first aperture such that a portion of the attachment device passes through the second aperture between the second surface and the second end of the attachment device. The third aperture has a diameter greater than the outer diameter and is positioned proximate the second end of the bushing element, such that the third aperture receives at least a portion of the bushing element.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. In particular, the invention is described in the context of being bushing assemblies. While some embodiments of the present invention are described in the context of being used in electric power transmission and distribution systems, the scope of the present invention is not limited to electric power transmission and distribution systems. Instead, as those skilled in the art will understand, the various embodiments of the present invention find applications in many different fields, including any field in which it is desirable to repair or reinforce a hole or aperture. Accordingly, it should be understood that the scope of the present invention includes use of bushing assemblies of the present invention in such fields. Further, while various exemplary embodiments of the present invention are described as being used in electric transmission systems, unless otherwise expressly stated, embodiments of the present invention used in transmission systems may be equally used in electric power distribution systems. Thus, unless otherwise expressly stated, as used herein, no limiting differences should be drawn between transmission and distribution systems.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Figure 1A:
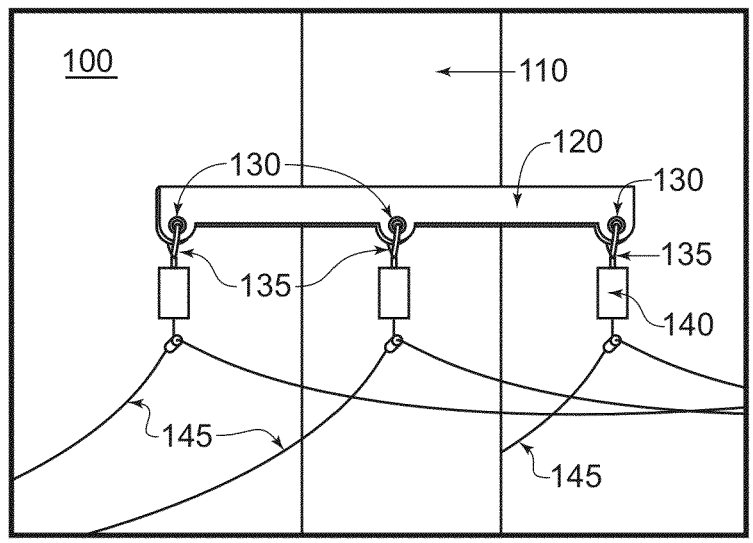
FIG. 1A illustrates a conventional electric power transmission system.
Figure 1B:
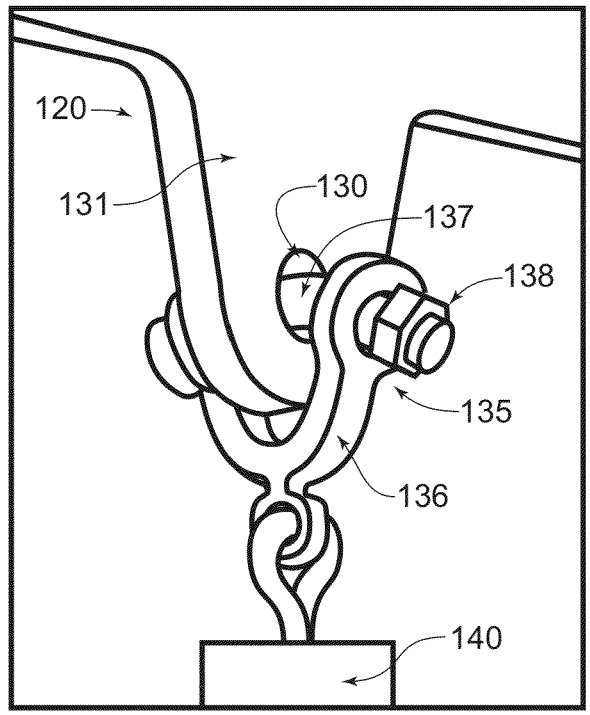
FIG. 1B provides a perspective view of a portion of a conventional electric power transmission system having an arm, hole, and clevis bolt assembly.
Figure 1C:
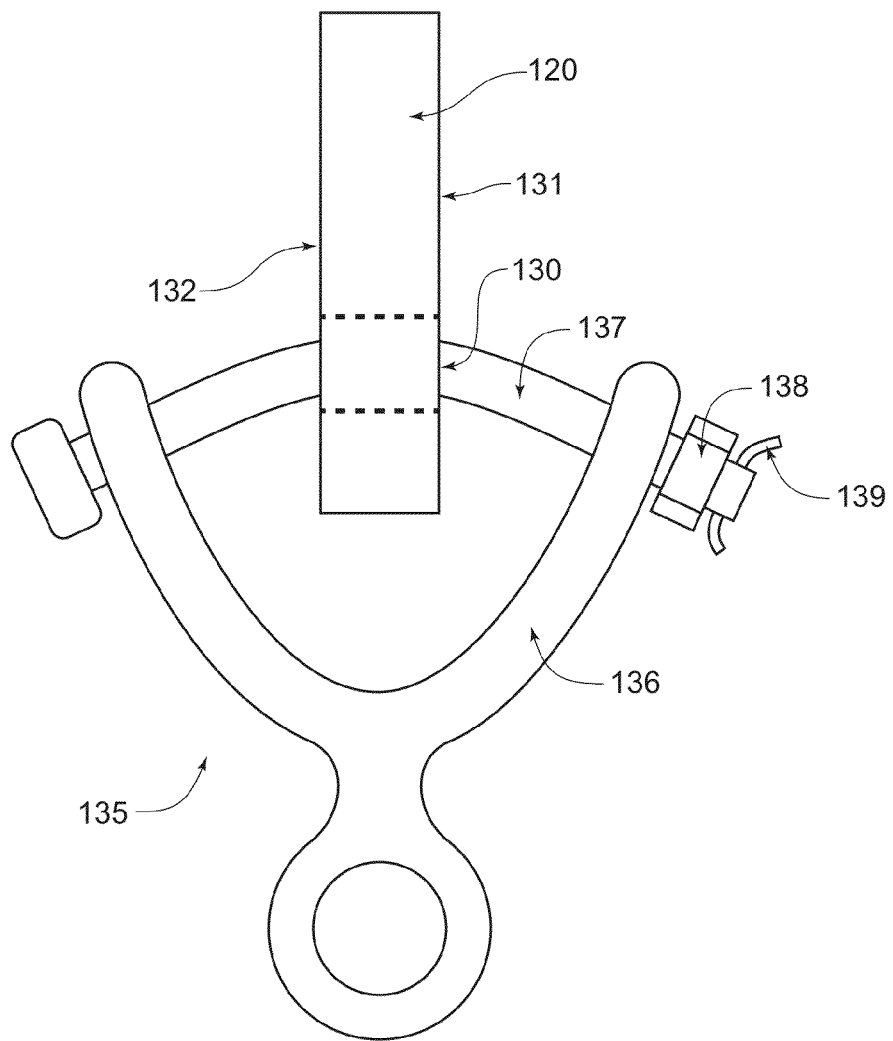
FIG. 1C provides a side view of a portion of a conventional electric power transmission system having an arm, hole, and clevis bolt assembly.

As discussed above, various exemplary embodiments of the present invention provide bushing assemblies for use in electric power transmission systems. A typical transmission system is depicted in FIG. 1A. The transmission system 100 comprises a support structure 110, an arm 120 carried by the support structure 110, a hole 130 through the arm 120 between a first surface 132 and second surface 131 of the arm 120, and an electrical conductor 145 suspended from the hole 130 via an insulator 140. In a typical transmission system 100, as shown in FIGS. 1B-1C, a clevis bolt assembly 135 is used to secure the insulator 140 to the hole 140. As further discussed above, the clevis pin 137 of the clevis bolt assembly 135 can erode the interior of the hole 130 due to friction caused by vibrations of the conductor 145. Therefore, various exemplary embodiments of the present invention provide bushing assemblies for reinforcing and/or repairing the hole 130 of a transmission system 100.

Figure 2A:
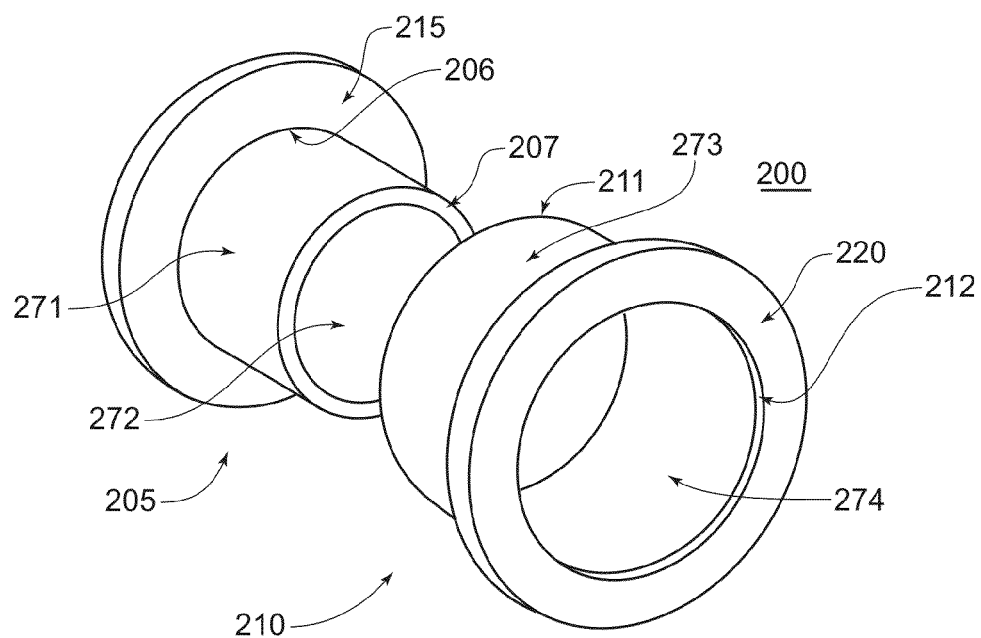
FIG. 2A illustrates an expanded view of a bushing assembly, in accordance with an exemplary embodiment of the present invention.

FIG. 2A illustrates a bushing assembly 200 in accordance with an exemplary embodiment of the present invention. The bushing assembly 200 comprises a first bushing element 205 and a second bushing element 210. The first bushing element has a first end 206, a second end 207, a first outer surface 271 with a first outer diameter, a first inner surface 272, and a first flange 215 positioned proximate the first end 206. The first flange 215 can extend radially outward from the first outer surface 271 and engage the first surface 132 of the arm 120 when the bushing assembly 200 engages the arm 120 of the support structure 110. The second bushing element 210 has a first end 211, a second end 212, a second inner surface 274 having a second inner diameter greater than the first outer diameter, a second outer surface 273, and a second flange 220 positioned proximate the second end 212. The second flange 220 can extend radially outward from the second outer surface 273 and engage the second surface 131 of the arm 120 when the bushing assembly 200 engages the arm 120 of the support structure 110.

Figure 2B:
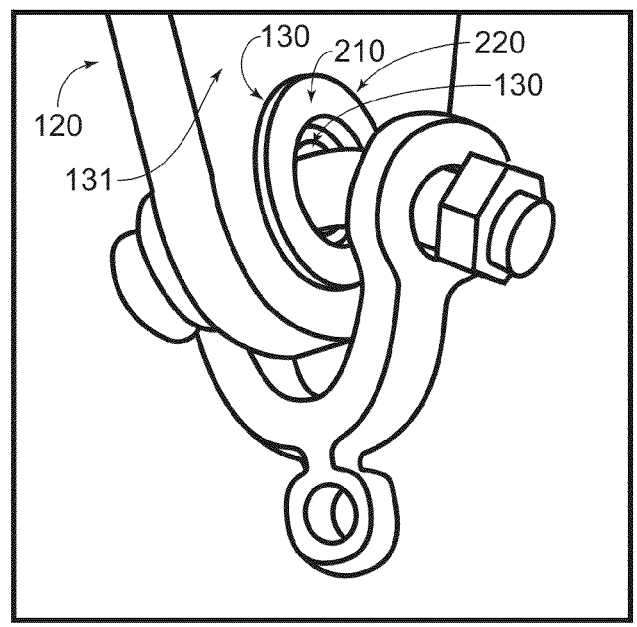
FIG. 2B provides a perspective view of a bushing assembly used in a transmission system, in accordance with an exemplary embodiment of the present invention.
Figure 2C:
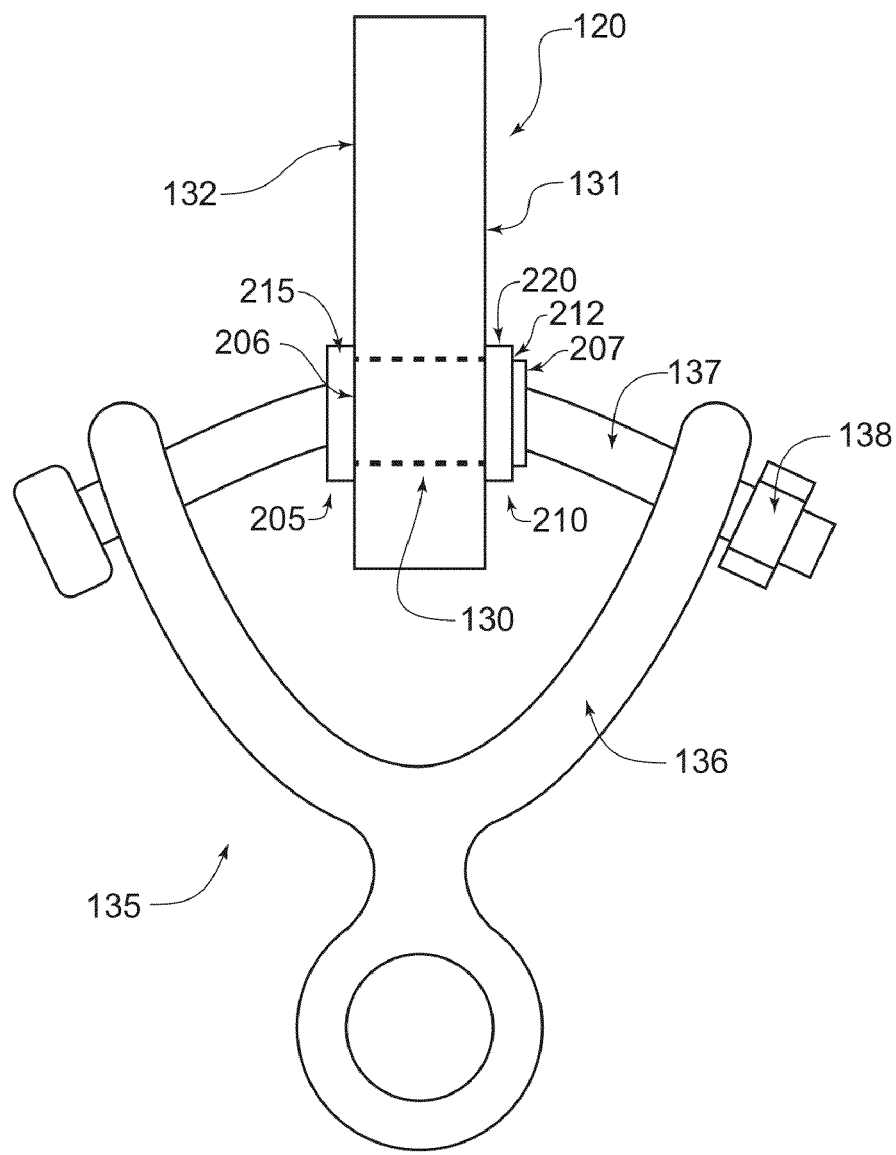
FIG. 2C provides a side view of a bushing assembly used in a transmission system, in accordance with an exemplary embodiment of the present invention.

FIGS. 2B-2C illustrate an exemplary bushing assembly 200 engaging the arm 120 of a support structure 110 in an electric power transmission system 100. The first flange 215 and second flange 220 engage the first surface 132 and second surface 131 of the arm 120, respectively. The second inner surface 274 of the second bushing element 210 defines a second channel from the first end 211 of the second bushing element 210 to the second end 212 of the second bushing element 210. The second channel can receive a portion of first bushing element 205. Additionally, the first inner surface 272 of the first bushing element 205 defines a first channel from the first end 206 of the first bushing element 205 to the second end 207 of the first bushing element 205. In an exemplary embodiment of the present invention, when the bushing assembly 200 engages the arm 120, the first channel has a first end proximate the first surface 132 of the arm 120 and a second end proximate the second surface 131 of the arm 120. A clevis pin 137 of a clevis bolt assembly 135 can pass through the first channel, such that the first channel receives a portion of the clevis pin 137, to secure the clevis bolt assembly 135 to the arm 120.

Figure 3A:
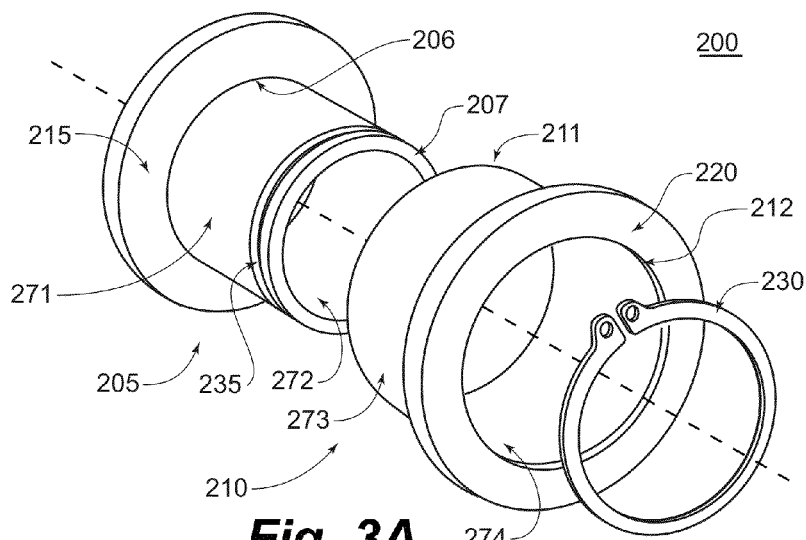
FIG. 3A provides an expanded view of a bushing assembly with a locking subsystem, in accordance with an exemplary embodiment of the present invention.
Figure 3C:
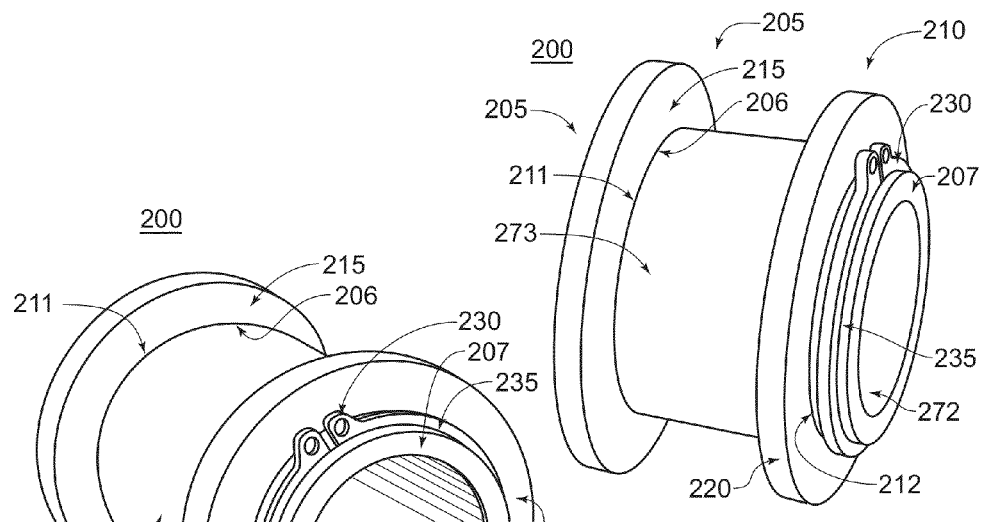
FIG. 3C provides a substantially side view of a bushing assembly with a locking subsystem, in accordance with an exemplary embodiment of the present invention.
Figure 3B:
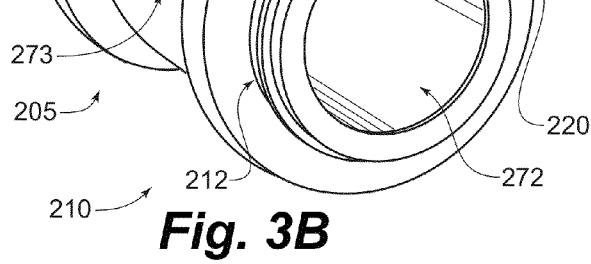
FIG. 3B provides a perspective view of a bushing assembly with a locking subsystem, in accordance with an exemplary embodiment of the present invention.

In some embodiments of the present invention, the bushing assembly 200 further comprises a locking subsystem for securing the first bushing element 205 to the second bushing element 210. In an exemplary embodiment of the present invention, as illustrated in FIGS. 3A-3C, the locking subsystem comprises a groove 235 proximate the second end 207 of the first bushing element 205 and a locking element 230 positioned about the groove 235. In some embodiments of the present invention, the groove 235 extends around the entire perimeter of the first bushing element 205. In other embodiments of the present invention, the groove 235 extends around a portion of the perimeter of the first bushing element 205. The locking element 230 can have an inner diameter less than the first outer diameter of the first bushing element 205 and an outer diameter greater than the second inner diameter of the second bushing element 210; thus, a portion of the locking element 230 can be positioned within the groove 235 and a portion of the locking element 230 extends radially outward from the groove 235 to prevent the first bushing element 205 and the second bushing element 210 from substantially separating. In some embodiments of the present invention, the locking element 230 is a continuous ring. In the exemplary embodiment of the present invention shown in FIGS. 3A-3C, the locking element is a spring clip.

Figure 4:
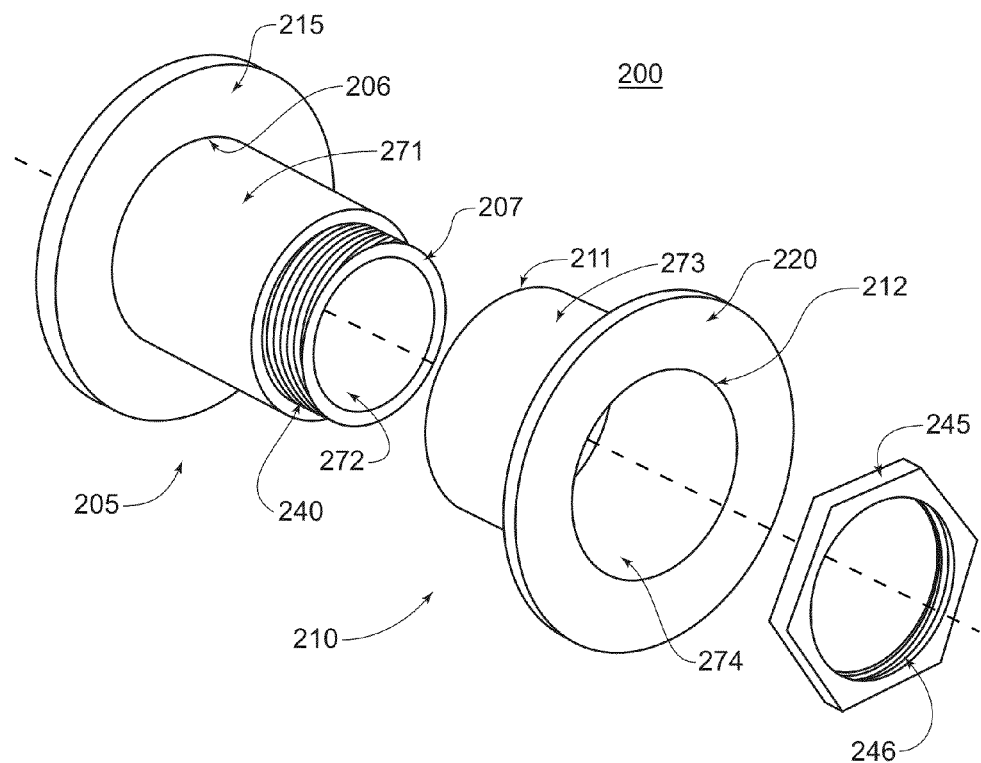
FIG. 4 provides expanded view of a bushing assembly with a locking subsystem having threaded members, in accordance with an exemplary embodiment of the present invention.

In some embodiments of the present invention, a locking device can screw onto the first bushing element to secure the first bushing element to the second bushing element. For example, in the exemplary embodiment of the present invention shown in FIG. 4, the locking subsystem comprises a portion of the first outer surface 271 proximate the second end 207 of the first bushing element 205 and a locking device 245. The portion of the first outer surface 271 comprises helical threads 240. The locking device 245 has an outer surface with an outer diameter greater than the second inner diameter of the second bushing element 210 and an inner surface comprising cooperative helical threads 246 engaging the helical threads 240 of the first outer surface 271. Because the outer diameter of the locking device 245 is greater than the second inner diameter of the second bushing element 210, the locking device 245 can engage the second flange 220 to prevent the first bushing element 205 and second bushing element 215 from substantially separating. In an exemplary embodiment of the present invention, the locking device 245 is a conventional nut that can screw onto the threaded portion 240 of the first bushing element 205.

Figure 5:
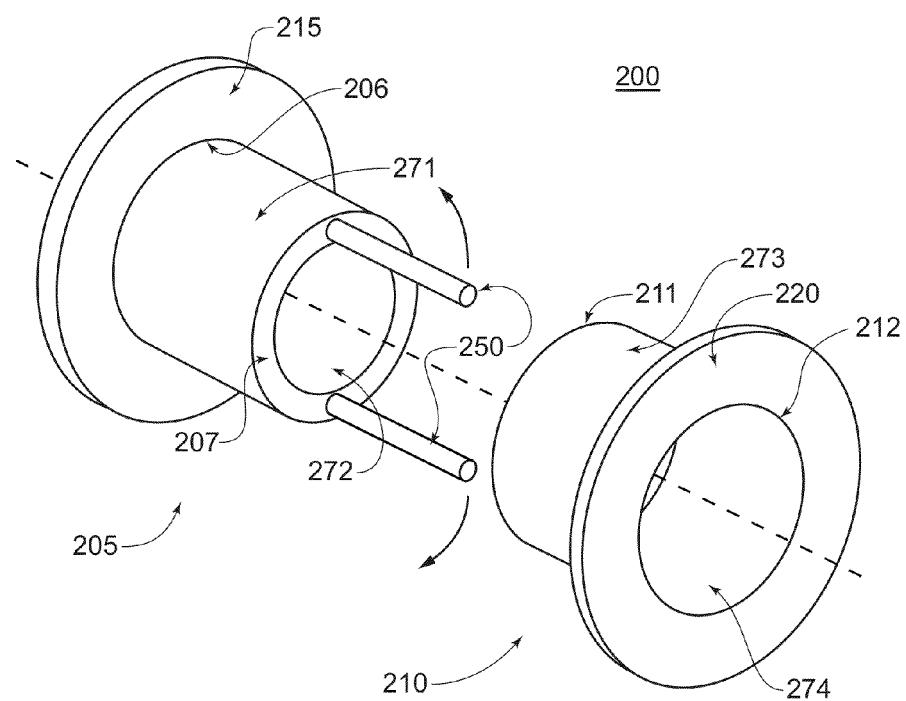
FIG. 5 provides an expanded view of a bushing assembly with a locking subsystem comprising a plurality of appendages, in accordance with an exemplary embodiment of the present invention.

As shown in FIG. 5, in yet another exemplary embodiment of the present invention, the locking subsystem comprises at least one appendage 250 positioned proximate the second end 207 of the first bushing element 205. When the bushing assembly 200 is unassembled, the appendage 250 extends from the second end 207 of the first bushing element 205 in a direction parallel to the first outer surface 271 of the first bushing element 205. When the bushing assembly 200 is assembled, such that the second bushing element 210 receives a portion of the first bushing element 205, the second end 207 of the first bushing element 205 can extend beyond the second end 212 of the second bushing element 210, and the at least one appendage 250 can pivot such that it extends radially outward from the first outer surface 271 to engage the second flange 220. Thus, the at least one appendage 250 can prevent the first bushing element 205 from substantially separating from the second bushing element 210.

Figure 6:
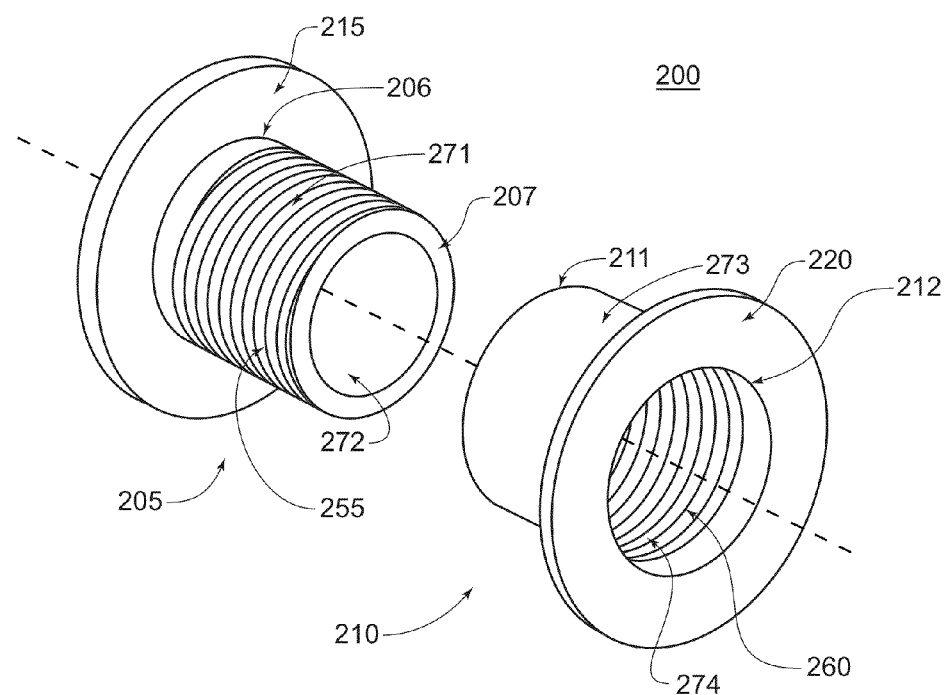
FIG. 6 provides an expanded view of a bushing assembly with cooperatively-threaded bushing elements, in accordance with an exemplary embodiment of the present invention.

In still yet another exemplary embodiment of the present invention, the first bushing element 205 and the second bushing element 210 comprise cooperative helical threads such that first bushing element 205 and the second bushing element 210 can screw together. For example, in accordance with the exemplary embodiment of the present invention illustrated in FIG. 6, at least a portion of the first outer surface 271 of the first bushing element 205 comprises male helical threads 255, and at least a portion of the second inner surface 274 comprises female helical threads 260 for cooperative engagement with the male helical threads 255. Thus, the first bushing element 205 and second bushing element 210 can be inserted into opposing surfaces of a hole 131, 132 and screw together, such that the first and second flanges 215, 220 engage the opposing surfaces 131, 132 of an arm 120.

In another exemplary embodiment of the present invention, the first and second bushing elements 205, 210 can be welded together, such as by a tack weld, once they are inserted in the hole 120 from opposing surfaces 131, 132, thus preventing substantial separation from one another.

Figure 7A:
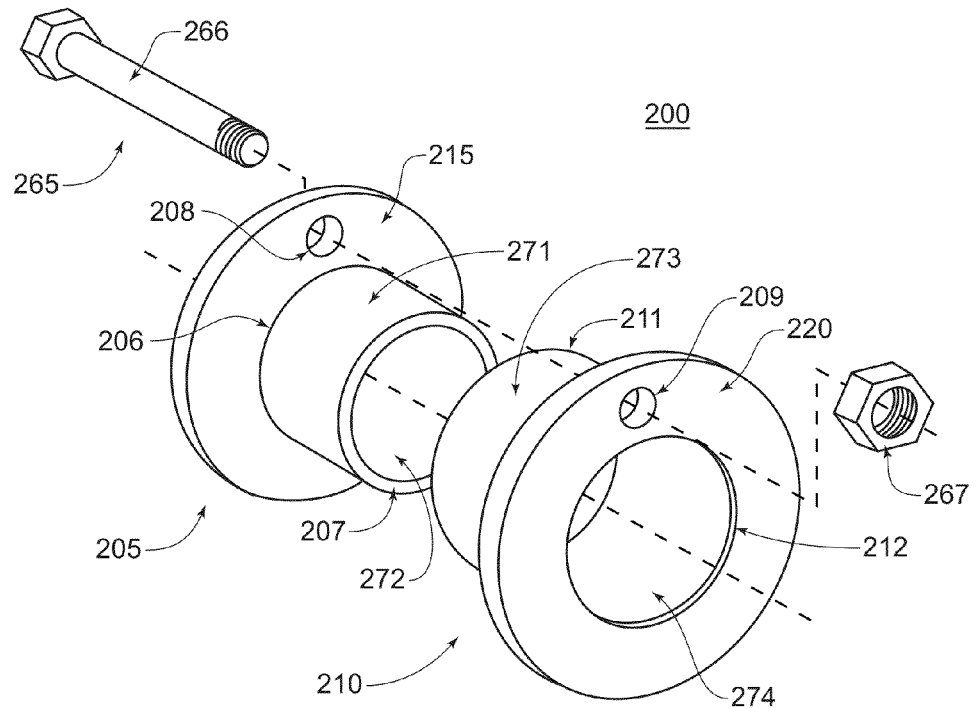
FIG. 7A provides an expanded view of a bushing assembly with an attachment device, in accordance with an exemplary embodiment of the present invention.
Figure 7B:
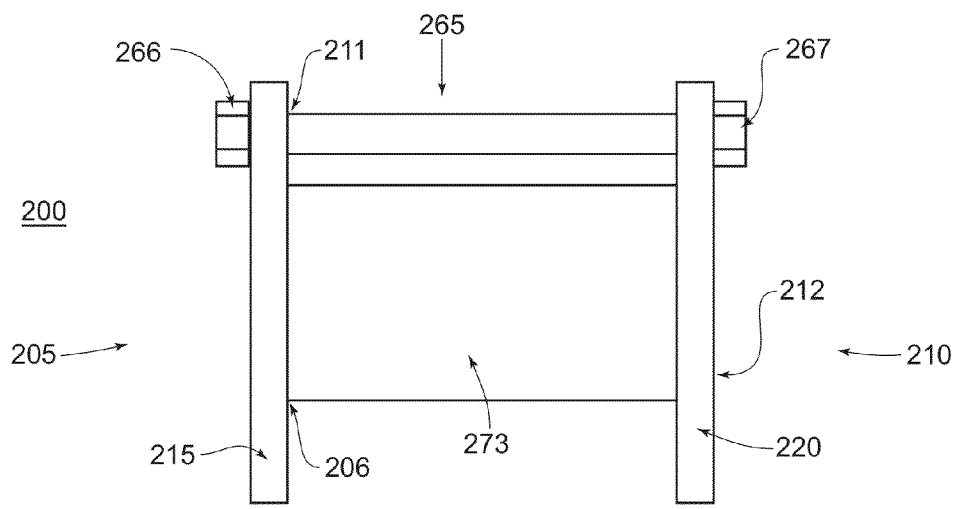
FIG. 7B provides an side view of a bushing assembly with an attachment device, in accordance with an exemplary embodiment of the present invention.

In yet another exemplary embodiment of the present invention, as shown in FIGS. 7A-7B, the first flange 215 comprises a first aperture 208 and the second flange 220 comprises a second aperture 209. In this embodiment, an attachment device 265 can be inserted through the first aperture 208, through the arm 120 and through the second aperture 209. Thus, a first end 266 of the attachment device 265 can engage the first flange 215 and a second end 267 of the attachment device 265 can engage the second flange 220. The attachment device 265 can be many attachment devices known in the art. In an exemplary embodiment of the present invention, the attachment device 265 comprises a nut and bolt.

Figure 8:
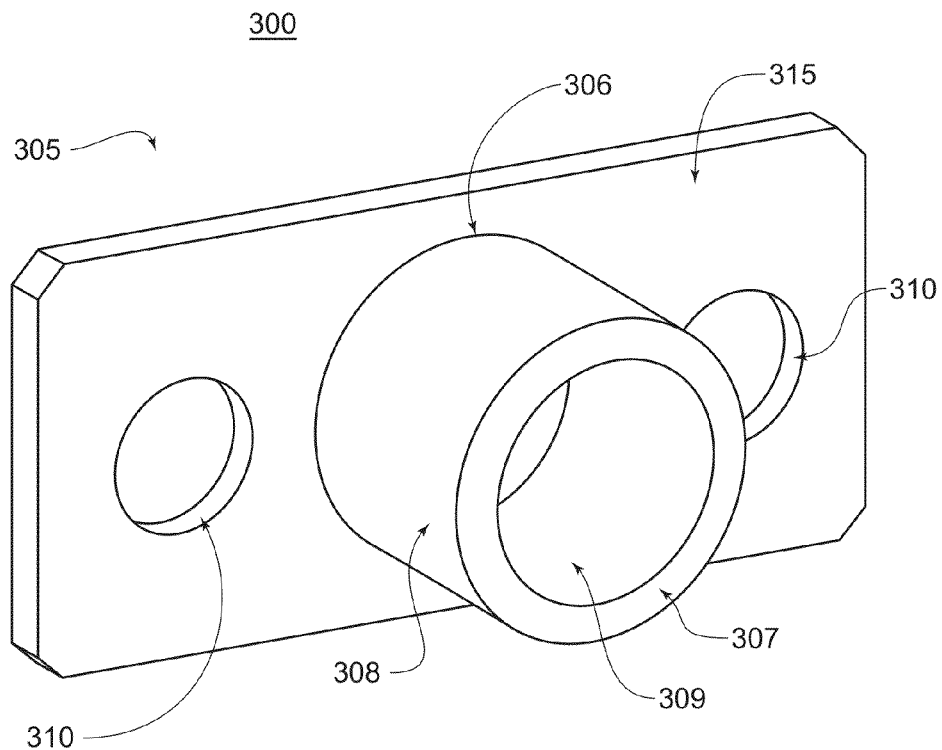
FIG. 8 provides a perspective view of a bushing assembly, in accordance with an exemplary embodiment of the present invention.

As discussed above, if the hole 130 of an arm 120 is not repaired after it becomes worn, it may deteriorate to the point that it can no longer support the weight of a conductor 145. For example, the hole 130 may be worn completely through, such that there is an opening in the bottom of the hole 130. In these situations, conventional methods required replacing the entire arm 120, regardless of whether other holes 130 in the arm 120 needed repairing. Therefore, as shown in FIGS. 8-9B, an exemplary embodiment of the present invention provides a bushing assembly 300 that can replace the hole 130 of an arm 120 comprising a bushing element 305 and an attachment device 325. The bushing element has a first end 306, a second end 307, an outer surface 308 having an outer diameter, an inner surface 309 having an inner diameter less than the outer diameter and defining a channel from the first end 306 to the second end 307, and a flange 315 proximate the first end 306 comprising at least one aperture 310. The second end 307 of the bushing element 305 can be inserted through the hole 130 of the arm 120 such that the flange 315 engages a first surface 132 of the arm 120. The flange 315 can by many different shapes, including but not limited to, circular, elliptical, rectangular, square, triangular, and the like. The attachment device 325 has a first end and a second end. The second end of the attachment device 325 can be inserted through the aperture 310 of the flange 315 and through an attachment hole bore into the arm 120, such that the first end of the attachment device engages the flange 315 and the second end of the attachment device engages the second surface 131 of the arm 120.

In another exemplary embodiment of the present invention, the flange can comprise a plurality of apertures 310, and a plurality of attachment devices 325 can be used to secure the bushing assembly 300 to the arm 120. The attachment device 325 can be many attachment devices known in the art. In an exemplary embodiment of the present invention, the attachment device 325 comprises a nut 327 and bolt 326.

Figure 9A:
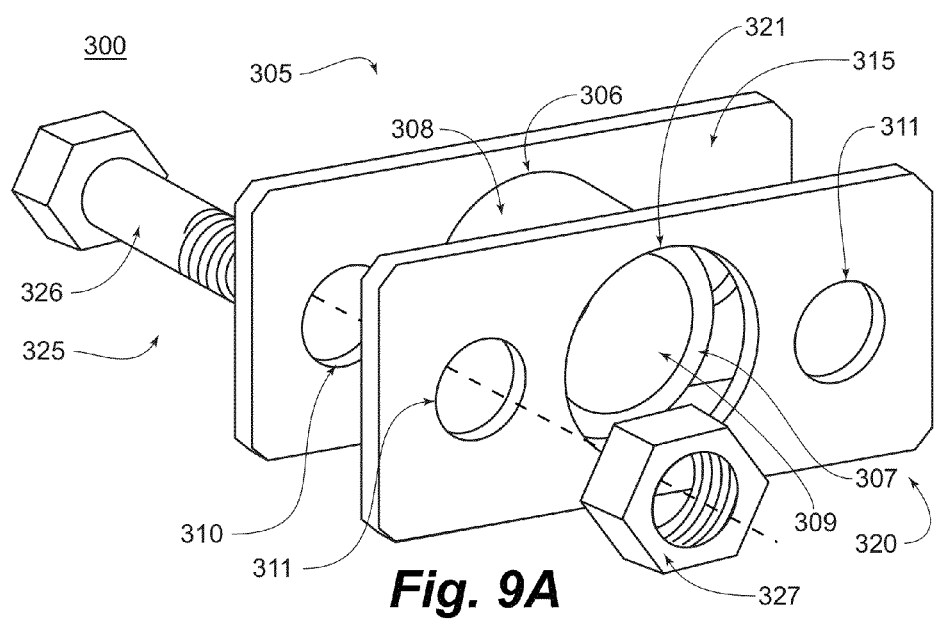
FIG. 9A provides an expanded view of a bushing assembly with an attachment device and mounting bracket, in accordance with an exemplary embodiment of the present invention.
Figure 9B:
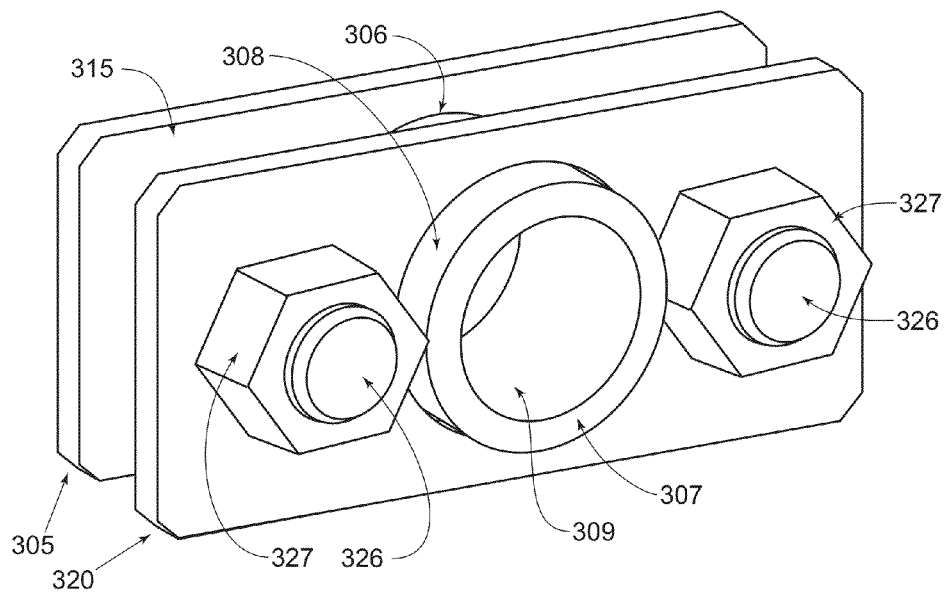
FIG. 9B provides a perspective view of a bushing assembly with an attachment device and mounting bracket, in accordance with an exemplary embodiment of the present invention.

In yet another exemplary embodiment of the present invention, as shown in FIGS. 9A-9B, the bushing assembly 300 further comprises a mounting bracket 320. The mounting bracket 320 can comprise a second aperture 311 aligned with the first aperture 310 of the flange 315, such that a portion of the attachment device 325 passes through the second aperture 311 between the second surface 131 of the arm 120 and the second end of the attachment device 325. The mounting bracket 320 can also comprise a third aperture 321 having a diameter greater than the outer diameter of the bushing element 305, such that the third aperture 321 can receive a portion of the bushing element 305.

The various elements of the bushing assemblies 200, 300 of the present invention be made of many different materials known in the art, including, but not limited to, corrosion resistant metal, iron, steel, brass, various metals, polymers, carbon fiber materials, metallic alloys, plastics, and the like. In an exemplary embodiment of the present invention, a bushing assembly 200, 300 comprises corrosion resistant metal, such that the bushing assembly 200, 300 will not rust.

Further, as those skilled in the art would understand, the bushing elements 205, 210, 305 and flanges 215, 220, 315 of the present invention are not limited to a particular geometrical shape. Instead, the various elements of the present invention may be many geometrical shapes, including, but not limited to, circular, elliptical, cylindrical, polygonal, and the like. Thus, as used herein, the term diameter should not be limited to a measurement of a circle or cylinder. Instead, if an element of the bushing assembly is non-circular or non-cylindrical, the term diameter should refer to the average distance from one side of the element, through the center of the element, and to the other side of the element. Thus, for example, as used herein, a polygon or polygonal-shaped element can have a diameter.

In addition to bushing assemblies 200, 300, various embodiments of the present invention provide methods of repairing, reinforcing, and/or replacing a hole 130 in the arm 120 of a support structure 110. In an exemplary embodiment of the present invention, the method comprises placing a bushing assembly 200, 300 about the hole 130. In another exemplary embodiment of the present invention, the step of placing the bushing assembly 200, 300 about the hole 130 comprises inserting the second end 207, 307 of a first bushing element 205, 305 into the hole 130 such that a first flange 215, 315 of the first bushing element 205, 305 engages a first surface 132 of the arm 120. In yet another exemplary embodiment of the present invention, the step of placing the bushing assembly 200, 300 about the hole comprises inserting the first end 211 of a second bushing element 210 into the hole 130 such that the second flange 220 of the second bushing element 210 engages the second surface 131 of the arm 120 and a channel of the second bushing element 210 receives at least a portion of the first bushing element 205. In still yet another exemplary embodiment of the present invention, the method further comprises securing the first bushing element 205, 305 to the second bushing element 210 with a locking subsystem. In even still yet another exemplary embodiment of the present invention, the method further comprises securing a bushing element 205, 210, 305 to the arm 120 by inserting an attachment device 265, 325 through an aperture 208, 209, 310 of the flange 215, 220, 315 of the bushing element 205, 210, 305 and through the arm 120. In another exemplary embodiment of the present invention, the method further comprises securing a bushing element 205, 305 and a mounting bracket 320 to the arm 120 using an attachment device 265, 325 by inserting the attachment device 265, 325 through an aperture 208, 310 of the flange 215, 315 of the bushing element 205, 210, 305, through the arm 120, and through an aperture 311 of the mounting bracket 320.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. In an electric power transmission system comprising a support structure and an arm carried by the support structure, the arm having a first surface, a second surface oppositely situated the first surface, and at least one hole therethrough between the first surface and the second surface for suspending a conductor via at least an insulator, an arm attachment bushing assembly comprising:
    a first bushing element having a first end, a second end, a first outer surface with a first outer diameter, a first inner surface, and a first flange positioned proximate the first end and extending outward from the first outer surface, the first flange engaging the first surface of the arm when the arm attachment bushing assembly engages the arm of the support structure; and
    a second bushing element receiving at least a portion of the first bushing element, the second bushing element having a first end, a second end, a second inner surface having a second inner diameter greater than the first outer diameter, a second outer surface, and a second flange positioned proximate the second end and extending outward from the second outer surface, the second flange engaging the second surface of the arm when the arm attachment bushing assembly engages the arm of the support structure,
    wherein the hole receives at least a portion of the arm attachment bushing assembly such that the first inner surface of the first bushing element defines a channel from the first surface of the arm to the second surface of the arm, and
    wherein at least a portion of the first outer surface comprises male helical threads and at least a portion of the second inner surface comprises female helical threads for cooperative engagement with the male helical threads.

2. The electric power transmission system of claim 1, wherein the channel defined by the first inner surface of the first bushing element receives at least a portion of a clevis bolt assembly.

3. The electric power transmission system of claim 1, further comprising a locking subsystem securing the first bushing element to the second bushing element.

4. The electric power transmission system of claim 3, wherein the locking subsystem comprises:
    a groove proximate the second end of the first bushing element; and
    a locking element positioned about the groove and having an inner diameter less than the first outer diameter and an outer diameter greater than the second inner diameter, the locking element engaging the second flange.

5. The electric power transmission system of claim 1, wherein the second end of the first bushing element extends beyond the second end of the second bushing element,
    wherein at least one appendage extends outward from the first outer surface of the first bushing element to engage the second flange.

6. The electric power transmission system of claim 1, further comprising an attachment device having a first end engaging the first flange and a second end engaging the second flange, the attachment device securing the arm attachment bushing assembly to the arm,
    wherein the first flange comprises a first aperture and the second flange comprises a second aperture, the first aperture and the second aperture aligned and receiving at least a portion of the attachment device when the arm attachment bushing assembly engages the arm of the support structure.

7. The electric power transmission system of claim 6, wherein the attachment device comprises a nut and bolt.

8. The electric power transmission system of claim 1, wherein the arm attachment bushing assembly comprises corrosion-resistant metal.

9. A bushing assembly comprising:
    a first bushing element having a first end, a second end, a first outer surface with a first outer diameter, a first inner surface defining a first channel between the first end and the second end, and a first flange positioned proximate the first end and extending outward from the first outer surface;
    a second bushing element having a first end, a second end, a second inner surface having a second inner diameter greater than the first outer diameter, a second outer surface, and a second flange positioned proximate the second end and extending outward from the second outer surface, wherein the second inner surface defines a second channel between the first and second ends of the second bushing element, the second channel receiving at least a portion of the first bushing element; and
    a locking subsystem proximate the first end of the first bushing element securing the first bushing element to the second bushing element, wherein the locking subsystem comprises:
        a groove proximate the second end of the first bushing element; and
        a locking element positioned about the groove and having an inner diameter less than the first outer diameter and an outer diameter greater than the second inner diameter, the locking element engaging the second flange.

10. The bushing assembly of claim 9, wherein the locking subsystem comprises:
- a portion of the first outer surface proximate the second end of the first bushing element comprising male helical threads; and
- a locking device having an outer surface with an outer diameter greater than the second inner diameter and an inner surface comprising female helical threads cooperatively engaging the male helical threads.

11. The bushing assembly of claim 9, wherein the locking subsystem comprises at least one appendage extending outward from first outer surface and engaging the second flange.

* * * * *